July 5, 1960      R. B. GRAY      2,944,118

BINAURAL PHONOGRAPH PICKUP

Filed April 14, 1958

INVENTOR.
Robert B Gray
BY Ralph Hammar
attorney

# United States Patent Office 2,944,118
Patented July 5, 1960

2,944,118

BINAURAL PHONOGRAPH PICKUP

Robert B. Gray, Erie, Pa., assignor to Erie Resistor Corporation, Erie, Pa., a corporation of Pennsylvania Filed Apr. 14, 1958, Ser. No. 728,339

9 Claims. (Cl. 179—100.41)

This invention is a binaural phonograph pickup having a single piezoelectric element of one of the polarized ceramics. Advantages include single step polarization and a high degree of freedom from interchannel cross talk.

Figure 1:
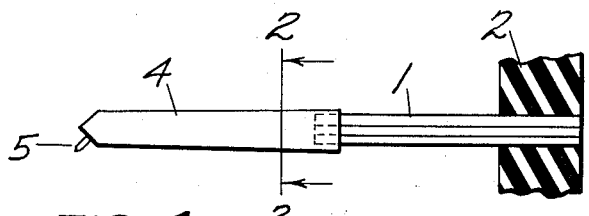
Figure 2:
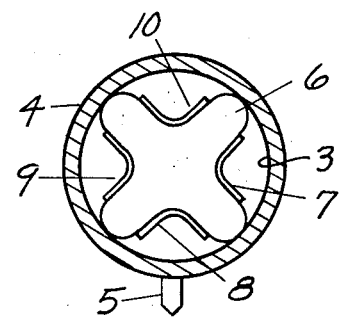
Figure 4:
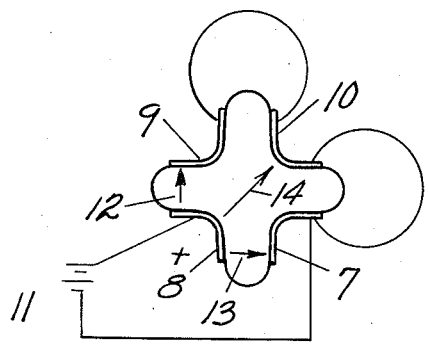
Figure 3:
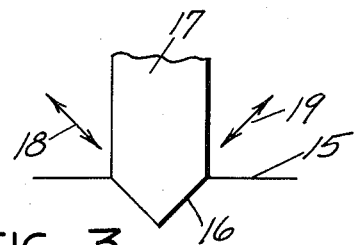
Figure 5:
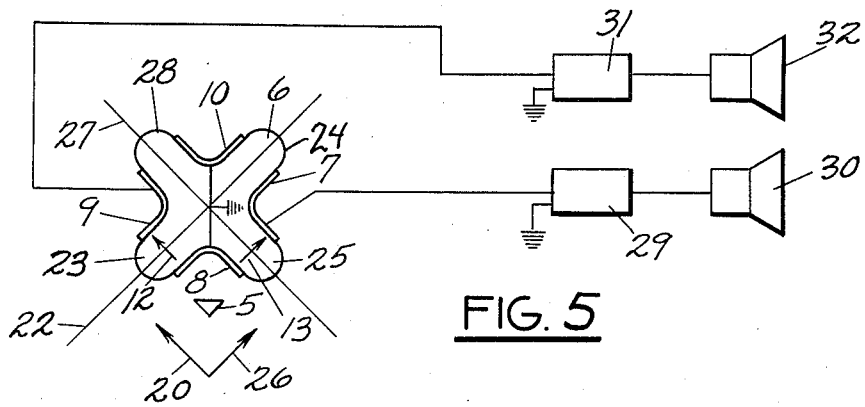

In the drawing, Fig. 1 is a diagrammatic side elevation of a pickup; Fig. 2 is a section on line 2—2 of Fig. 1; Fig. 3 is a diagram of the record groove; Fig. 4 is a diagram of the polarizing circuit for the ceramic element; and Fig. 5 is a circuit diagram.

The pickup has a single element 1 of one of the polarizable ceramics such as barium titanate having one end fixed in a stationary support by a rubber bushing 2 having the other end fixed in a socket 3 in a rigid metal holder or chuck 4 for a needle point 5. The element may be secured in the socket 3 by cementing and the needle 5 may likewise be secured in the chuck by cementing, thereby producing a rigid assembly.

The piezoelectric element consists of a bar of ceramic having four longitudinally extending, radially projecting flanges 6 spaced 90 degrees from each other so that the bar in transverse section is of cross shape. Longitudinally extending electrodes 7, 8, 9 and 10 are coated on the ceramic between adjacent flanges resulting in diametrically opposed pairs of electrodes, each pair centered on an axis 90 degrees from the other. For example, as shown in Fig. 5, the electrodes 7 and 9 are centered on a horizontal axis while the electrodes 8 and 10 are centered on a vertical axis.

In polarizing the ceramic, one of the electrodes, for example the electrode 8, is connected to the positive side of the polarizing voltage 11 while the other three electrodes are connected to the negative side of the polarizing voltage. This results in polarization in the direction indicated by the arrow 12 between electrodes 8 and 9 and in the direction indicated by the arrow 13 between electrodes 8 and 7. There may also be a weaker polarization between electrodes 8 and 10 in the direction indicated by arrow 14 but this polarization is negligible. There is no polarization between electrodes 9 and 10 and 7 and 10 because these are all at ground potential. If electrode 10 were not grounded, it would tend to assume ground potential by reason of its close association with electrodes 7 and 9. The polarization may be carried out in any desired manner either by the so-called hot polarization process where the ceramic is heated to and cooled from the Curie point or transformation temperature with the polarizing voltage applied or by the cold polarization process where the polarizing voltage is applied at temperatures below the Curie point. A single step of polarization is all that is needed.

The pickup is used on single groove binaural records such as diagrammatically indicated in Fig. 3 where the numeral 15 designates the record surface, the numeral 16 designates the record groove and the numeral 17 designates the record cutter. One of the binaural channels causes excursion of the cutter in the direction of arrow 18 while the other of the binaural channels causes excursion of the cutter in the direction of the arrow 19. In playing the record, the needle follows the record groove and duplicates the excursion of the record cutter.

In the assembly of the pickup, the piezoelectric element is oriented in the needle chuck or holder 4 so that the needle 5 is centered directly below the electrode 8 and the electrodes 8 and 10 are grounded. With this orientation, the recording of the left channel of the binaural system will produce a force on the needle inclined in the direction of arrow 20 causing bending of the piezoelectric element about axis 22 which extends through the center of the flanges 23 and 24 midway between the opposed areas of electrodes 8 and 9 and electrodes 7 and 10. There is no polarization between electrodes 7 and 10. The polarization between the opposed areas of electrodes 8 and 9 as indicated by the arrow 12 is such that theoretically there is no output produced by bending about the axis 22 because the stress is in opposite directions on opposite sides of the axis and produces voltages which cancel each other. If there were any output due to unbalance of the opposed areas of the electrodes or non uniformity of the ceramic, this output would be small because the opposed areas of electrodes 8 and 9 are very close to the neutral axis 22. For all practical purposes, no output is produced between electrodes 8 and 9. However, bending of the rib 25 about the axis 22 by a force in the direction of arrow 20 produces a tension in a direction at right angles to the arrow 13 thus producing a voltage between the opposed areas of electrodes 7 and 8. Since the electrode 8 is grounded, the voltage output for the left channel appears on electrode 7. There is no polarization between electrodes 9 and 10 so that no output is produced on these electrodes due to a force in the direction of arrow 20. Since electrodes 8 and 10 are grounded, there is no capacity coupling of the voltage from electrode 7 to electrode 9.

The recording of the right channel exerts a force on the needle 5 in the direction of arrow 26 thereby causing bending of the piezoelectric element about an axis 27 extending through the center line of flanges 25 and 28. Since there is no polarization between electrodes 9 and 10 and 7 and 10, no voltage is generated in these electrodes by the force in the direction of arrow 26. The force in the direction of arrow 26 tends to produce equal and opposite voltages on the electrodes 7 and 8 due to the polarization in the direction of arrow 13. This results in no net output except the possibly very slight amount due to manufacturing variations in the ceramic and the electrodes. The size of the output is further decreased by the fact that the electrodes 7 and 8 are very close to the neutral axis 27 of the piezoelectric element. The force in the direction of arrow 26 causes a tension to appear in flange 23 resulting in the generation of a voltage between the electrodes 8 and 9 due to polarization in the direction of arrow 12. The electrode 8 being grounded, the output for the right channel appears on the electrode 9. The grounding of electrodes 8 and 10 prevents capacity coupling of any right channel voltages on electrode 9 to the left channel output electrode 7.

Any polarization in the direction of arrow 14 (if it exists) produces no output in either channel because it is centered on both axes 22 and 27.

In use, the left channel output appearing on electrode 7 is fed through amplifier 29 to speaker 30 and the right channel output appearing on electrode 9 is fed through amplifier 31 to speaker 32. The speakers 30 and 32 are so placed as to reconstitute the binaural sound.

The pickup has very low interchannel cross talk because of the excellent shielding between the electrodes 7 and 9 which serve respectively as the output electrodes for the left and right channels. The element has high capacity which tends to reduce the output voltage. The capacity can be reduced and the output voltage increased by eliminating the parts of electrodes 7 and 9 which are opposite the electrode 10. That would amount to cutting the electrode area of each of the electrodes 7 and 9 in half with a resultant decrease in capacity and a raising of the output voltage. An alternative method of decreasing the capacity in order to increase the output voltage is to eliminate electrode 10. This results in nearly doubling the output voltage, but does not raise the cross talk, which remains below 20 db.

What is claimed as new is:

1. A piezoelectric element having separate outputs respectively in response to bending about one and the other of two axes at right angles to each other, said element comprising a bar-like body of polarizable ceramic having four longitudinally extending radially projecting flanges spaced substantially 90 degrees from each other, two of the flanges being centered on one of said axes and the other two flanges being centered on the other of said axes, four longitudinally extending electrodes spaced substantially 90 degrees from each other and each being between a different pair of adjacent flanges, said bar being polarized from one electrode lying between said two axes to two adjacent electrodes, said one electrode and the diametrically opposite electrode being grounded, the other two electrodes serving respectively as output electrodes for bending about one and the other of said two axes.

2. A phonograph pickup for use with records having a single groove with excursions in two directions at right angles to each other and at 45 degrees to the record surface corresponding respectively to two binaural channels, a piezoelectric element actuated by a needle following said excursions, said element comprising a bar-like body of polarizable ceramic having four longitudinally extending radially projecting flanges spaced substantially 90 degrees from each other, two of the flanges being centered on an axis at 45 degrees to the record surface and the other two flanges being centered on another axis at right angles to the first axis and also at 45 degrees to the record surface, four longitudinally extending electrodes spaced substantially 90 degrees from each other and each being between a different pair of adjacent flanges, said bar being polarized from one electrode lying between said two axes to two adjacent electrodes, said one electrode and the diametrically opposite electrode being grounded, the other two electrodes serving respectively as output electrodes for one and the other of said two binaural channels.

3. A piezoelectric element having separate outputs respectively in response to bending about one and the other of two axes at right angles to each other, said element comprising a bar-like body of polarizable ceramic having four electrodes symmetrically distributed about the longitudinal axis of the bar, said bar being polarized from one electrode to two adjacent electrodes, said one electrode and the diametrically opposite electrode lying between two axes at right angles to each other and both being grounded, and said two adjacent electrodes serving respectively as output electrodes for bending about one and the other of said two axes.

4. A phonograph pickup for use with records having a single groove with excursions in two directions at right angles to each other and at 45 degrees to the record surface corresponding respectively to two binaural channels, a piezoelectric element actuated by a needle following said excursions, said element comprising a bar-like body of polarizable ceramic having four electrodes symmetrically distributed about the longitudinal axis of the bar, two of the electrodes being centered on an axis vertical to the record surface and the other two electrodes being centered on another axis parallel to the record surface, said bar being polarized by a field from the lowermost electrode centered on said vertical axis to the two adjacent electrodes, said lowermost electrode lying between two axes inclined at 45 degrees to the record surface and it and the diametrically opposite electrode being grounded, and said two adjacent electrodes serving respectively as output electrodes for one and the other of said two binaural channels.

5. A bar-like polarizable piezoelectric element having separate outputs in response to bending about one and the other of two intersecting axes each constituting a neutral axis of the bar, a ground electrode on the bar between and spaced from one side of each of the axes, two output electrodes spaced from each other and respectively on the side of one and the other of said axes opposite the ground electrode, said bar being polarized transverse to each of the axes respectively between the ground electrode and one and the other of the output electrodes, and another ground electrode between and spaced from the output electrodes cooperating with the first ground electrode to provide a ground plane between the output electrodes.

6. A bar-like polarizable piezoelectric element having separate outputs in response to bending about one and the other of two intersecting axes each constituting a neutral axis of the bar, a ground electrode on the bar between and spaced from one side of each of the axes, two output electrodes spaced from each other and respectively on the side of one and the other of said axes opposite the ground electrode, said bar being polarized transverse to each of the axes respectively between the ground electrode and one and the other of the output electrodes.

7. The piezoelectric element of claim 6 in which the bar has four longitudinally extending radially projecting ribs spaced substantially 90 degrees from each other, the ground electrode and the two output electrodes each being between a different pair of ribs.

8. A phonograph pickup for use with records having a single groove with excursions in two directions at right angles to each other and at 45 degrees to the record surface corresponding respectively to two binaural channels, a piezoelectric element actuated by a needle following said excursions, said element comprising a bar-like body of polarizable ceramic having four longitudinally extending radially projecting flanges spaced substantially 90 degrees from each other, two of the flanges being centered on an axis at 45 degrees to the record surface and the other two flanges being centered on another axis at right angles to the first axis and also at 45 degrees to the record surface, at least three longitudinally extending electrodes each being between a different pair of adjacent flanges, one of the electrodes being a ground electrode and centered on an axis perpendicular to the record surface, and the two electrodes on each side of the ground electrode serving as output electrodes for one and the other of the two binaural channels, said bar being polarized from said ground electrodes to said output electrodes.

9. A phonograph pickup for binaural records having two channels cut in a single record groove in two directions at right angles to each other comprising a bar supported at one end and having a needle coupled to the other end for bending the bar about axes at right angles to said two directions, said bar being of polarizable ceramic having two pairs of longitudinally extending electrodes, with the electrode of each pair centered on axes substantially at right angles to each other and at 45 degrees to the axes about which the bar is bent, and said bar being polarized from one electrode of one of the pairs in divergent directions to an adjacent electrode of the other pair.

References Cited in the file of this patent

UNITED STATES PATENTS

| | | |
|---|---|---|
| 2,439,499 | Williams et al. | Apr. 13, 1948 |
| 2,515,446 | Gravley | July 18, 1950 |
| 2,540,412 | Adler | Feb. 6, 1951 |
| 2,625,663 | Howatt | Jan. 13, 1953 |